(12) United States Patent
Saleh et al.

(10) Patent No.: US 12,163,006 B2
(45) Date of Patent: Dec. 10, 2024

(54) COMPOSITIONS CONTAINING ALUMINA NANOPARTICLES FOR OIL-WATER SEPARATION

(71) Applicants: Saudi Arabian Oil Company, Dhahran (SA); King Fahd University of Petroleum & Minerals, Dhahran (SA)

(72) Inventors: Tawfik A. Saleh, Dhahran (SA); Elaf A. Ahmed, Dhahran (SA); Hasan Al Abdulgader, Dammam (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 17/870,314

(22) Filed: Jul. 21, 2022

(65) Prior Publication Data

US 2024/0026117 A1 Jan. 25, 2024

(51) Int. Cl.
*C08K 3/22* (2006.01)
*C08K 9/06* (2006.01)
*C08K 9/08* (2006.01)

(52) U.S. Cl.
CPC .......... *C08K 3/22* (2013.01); *C08K 9/06* (2013.01); *C08K 9/08* (2013.01); *C08K 2003/2227* (2013.01); *C08K 2201/011* (2013.01)

(58) Field of Classification Search
None
See application file for complete search history.

(56) References Cited

U.S. PATENT DOCUMENTS

| | | | |
|---|---|---|---|
| 5,607,744 A * | 3/1997 | Diener | C08K 9/06 428/209 |
| 7,081,234 B1 * | 7/2006 | Qi | C09D 17/00 423/325 |
| 8,361,176 B2 | 1/2013 | Seth et al. | |
| 10,087,082 B2 | 10/2018 | Schlenoff | |
| 2013/0101540 A1 | 5/2013 | Unal et al. | |

FOREIGN PATENT DOCUMENTS

| | | |
|---|---|---|
| CN | 105968254 | 9/2016 |
| CN | 107876033 | 4/2018 |

OTHER PUBLICATIONS

Cao et al., "Thermo and pH dual-responsive materials for controllable oil/water separation," ACS Applied Materials & Interfaces, Jan. 2014, 6(3):2026-2030, 5 pages.

(Continued)

*Primary Examiner* — Ronak C Patel
(74) *Attorney, Agent, or Firm* — Fish & Richardson P.C.

(57) ABSTRACT

The disclosure relates to compositions containing alumina nanoparticles. Each alumina nanoparticle is covalently bonded to polyurethane and two different functional groups. One of the functional groups contains a fluorocarbon. The other functional group is capable of undergoing protonation. The wettability of the compositions can be altered by changes in pH. The disclosure also provides methods for synthesizing the compositions and using the compositions in oil-water separation applications.

20 Claims, 5 Drawing Sheets

(56) References Cited

OTHER PUBLICATIONS

Cheng et al., "Development of smart poly(vinylidene fluoride)-graft-poly(acrylic acid) tree-like nanofiber membrane for pH-responsive oil/water separation," Journal of Membrane Science, Jul. 2017, 534:1-8, 8 pages.
Chu et al., "Oil/water separation with selective superantiwetting/superwetting surface materials," Angewandte Chemie—Int Ed., Feb. 2015, 54(8):2328-2338, 12 pages.
Dang et al., "In Situ and Ex Situ pH-Responsive Coatings with Switchable Wettability for Controllable Oil/Water Separation," ACS Applied Materierals & Interfaces, Nov. 2016, 8(45):31281-31288, 8 pages.
Ge et al., "Superhydrophilic and underwater superoleophobic nanofibrous membrane with hierarchical structured skin for effective oil-in-water emulsion separation," Journal of Materials Chemistry A, 2017, 5(2):497-502, 9 pages.
Guo et al., "Inspired smart materials with external stimuli responsive wettability: A review," RSC Advances, Mar. 2016, 6(43):36623-36641, 18 pages.
Guo et al., "Macroporous monoliths with pH-induced switchable wettability for recyclable oil separation and recovery," Journal of Colloid and Interface Science, Jan. 2019, 534:183-194, 34 pages.
Hassler, "Accidental versus operational oil spills from shipping in the baltic sea: Risk governance and management strategies," Ambio, Feb. 2011, 40(2):170-178, 9 pages.
Ivshina et al., "Oil spill problems and sustainable response strategies through new technologies," Environmental Science: Processes & Impacts, Jun. 2015, 17(7):1201-1219, 19 pages.
Ju et al., "A pH-responsive smart surface for the continuous separation of oil/water/oil ternary mixtures," NPG Asia Materials, Jul. 2014, 6(7):e111, 6 pages.
Li et al., "Superhydrophobic meshes that can repel hot water and strong corrosive liquids used for efficient gravity-driven oil/water separation," Nanoscale, Mar. 2016, 8(14):7638-7645, 30 pages.
Ma et al., "Flexible, durable and magnetic nanofibrous membrane with pH-switchable wettability for efficient on-demand oil/water separation," Environmental Science Nano, Nov. 2019, 6(12):3699-3711, 13 pages.
Qu et al., "A multifunctional superwettable material with excellent pH-responsive for controllable in situ separation multiphase oil/water mixture and efficient separation organics system," Applied Surface Science, Jun. 2020, 515:145991, 12 pages.
Qu et al., "Eco-friendly superwettable functionalized-fabric with pH-bidirectional responsiveness for controllable oil-water and multi-organic components separation," Colloids and Surfaces A: Physicochemical and Engineering Aspects, Sep. 2021, 624:126817, 15 pages.
Qu et al., "pH-Responsive Multifunctional Materials with Switchable Superamphiphobicity and Superoleophobicity-Superhydrophilicity for Controllable Oil/Water Separation," Fibers and Polymers, Mar. 2021, 22(3):629-638, 10 pages.
Shahabadi et al., "Bio-inspired superhydrophobic and superoleophilic nanofibrous membranes for non-aqueous solvent and oil separation from water," Separation and Purification Technology, Feb. 2019 210:587-599, 13 pages.
Ulijn, "Enzyme-responsive materials: A new class of smart biomaterials," Journal of Materials Chemistry, Apr. 2006, 16(23):2217-2225, 9 pages.
Wang et al., "A novel 3D porous modified material with cage-like structure: fabrication and its demulsification effect for efficient oil/water separation," Journal of Materials Chemistry A, Feb. 2017, 5(12):5895-5904, 11 pages.
Xue et al., "Special wettable materials for oil/water separation," Journal of Materials Chemistry A, Feb. 2014, 2(8):2445-2460, 16 pages.
Yang et al., "Rapid demulsification of pickering emulsions triggered by controllable magnetic field," Scientific Reports, Oct. 2020, 10(1):1-7, 7 pages.
Yi et al., "Thermoresponsive Polyurethane Sponges with Temperature-Controlled Superwettability for Oil/Water Separation," ACS Applied Polymer Materials, Mar. 2020, 2(5):1764-1772, 9 pages.
Zheng et al., "Electric Field Induced Switchable Wettability to Water on the Polyaniline Membrane and Oil/Water Separation," Advanced Materials Interfaces, Sep. 2016, 3(18):1-6, 6 pages.
Zhu et al., "A Robust Absorbent Material Based on Light-Responsive Superhydrophobic Melamine Sponge for Oil Recovery," Advanced Materials Interfaces, Mar. 2016, 3(5):1500683, 7 pages.
Franco et al., "Adsorptive removal of oil spill from oil-in-fresh water emulsions by hydrophobic alumina nanoparticles functionalized with petroleum vacuum residue," Journal of Colloid and Interface Science, Jul. 1, 2014, 425:168-177, 10 pages.
SAIP Examination Report in Saudi Arabian Appln. No. 123447500, dated Aug. 1, 2024, 11 pages (with English translation).

\* cited by examiner

COMPOSITIONS CONTAINING ALUMINA NANOPARTICLES FOR OIL-WATER SEPARATION

FIELD

The disclosure relates to compositions containing alumina nanoparticles. Each alumina nanoparticle is covalently bonded to polyurethane and two different functional groups. One of the functional groups contains a fluorocarbon. The other functional group is capable of undergoing protonation. The wettability of the compositions can be altered by changes in pH. The disclosure also provides methods for synthesizing the compositions and using the compositions in oil-water separation applications.

BACKGROUND

Produced water or oilfield wastewater generated by oil and gas operations contains organic and inorganic contaminants that can require treatment.

SUMMARY

The disclosure relates to compositions containing alumina nanoparticles. Each alumina nanoparticle is covalently bonded to polyurethane and two different functional groups. One functional group contains a fluorocarbon, and the other functional group is capable of undergoing protonation.

The materials can have a relatively high efficiency, stability and/or oil absorption capacity compared with some other absorbent materials. The functional group capable of undergoing protonation can enable the wettability of the compositions to be altered by changes in the pH. The change in wettability can therefore be achieved relatively easily, rapidly and with less energy consumption compared to certain other materials with variable wettability. The material can be relatively hydrophilic (e.g., superhydrophilic) under acidic pH conditions and relatively hydrophobic (e.g., superhydrophobic) under basic pH conditions. The protonation and changes in wettability are reversible allowing the material to reversibly absorb and desorb a desired compound, such as an organic compound (e.g. oil, a non-polar solvent, a hydrocarbon, a halocarbon) present in water. The material can maintain its properties (e.g. absorption capacity, switchable wettability, hydrophobicity, and/or hydrophilicity) during the separation process and even after several cycles between the hydrophobic and hydrophilic states as modified by pH.

The compositions can be used with a filtration unit to separate an organic contaminant from water (e.g., produced water, oilfield wastewater). The compositions can be used with a separator vessel (e.g. gravity separator) to separate an organic contaminant from water (e.g., produced water, oilfield wastewater).

The compositions of the disclosure can be synthesized relatively easily and/or inexpensively compared to some other absorption materials. The reagents used to synthesize the compositions can be relatively inexpensive compared to those used to synthesize certain other absorption materials. Additional functional groups (e.g., amine, amide, carboxyl, sulfonate, pyridine, long organic branch, hydroxyl groups) can be added to the compositions by facile dip-coating method.

In a first aspect, the disclosure provides a composition that includes alumina nanoparticles. Each alumina nanoparticle is covalently bonded to: i) a polyurethane; ii) a first functional group that includes a fluorocarbon; and iii) a second functional group different from the first functional group. The second functional group is capable of undergoing protonation.

In some embodiments, the second functional group includes an amine, amide, carboxyl, sulfonate, pyridine, and/or hydroxyl group.

In some embodiments, the second functional group includes a derivative of 3-(aminopropyl)triethoxysilane, (3-aminopropyl)-diethoxy-methylsilane, 3-aminopropyl)-dimethyl-ethoxysilane and/or (3-aminopropyl)-trimethoxysilane.

In some embodiments, the first functional group includes a derivative of 1H,1H,2H,2H-perfluorooctyl-triethoxysilane, 1H,1H,2H,2H-perfluorooctyl-trimethoxysilane, 1H,1H,2H,2H-perfluorooctyl-diethoxyl-methylsilane and/or 1H,1H,2H,2H-perfluorooctyl-dimethyl-ethoxysilane.

In some embodiments, the polyurethane is directly covalently bonded to the alumina nanoparticle, the first functional group is directly covalently bonded to the alumina nanoparticle, and/or the second functional group is directly covalently bonded to the alumina nanoparticle.

In some embodiments, at least a portion of the first functional group is covalently bonded to other first functional groups that are covalently bonded to the same alumina nanoparticle, at least a portion of the first functional group is covalently bonded to second functional groups that are covalently bonded to the same alumina nanoparticle, and/or at least a portion of the second functional group is covalently bonded to other second functional groups that are covalently bonded to the same alumina nanoparticle.

In some embodiments, when the composition is at a pH of less than 7, the composition is superhydrophilic. In certain embodiments, when the composition is at a pH of greater than 7, the composition is superhydrophobic.

In some embodiments, when the composition is at a pH of less than 7, the composition has a water contact angle of 0° to 90°. In certain embodiments, when the composition of at a pH of greater than 7, the composition has a water contact angle of 90° to 180°.

In some embodiments, the composition has an oil absorption capacity of at least 27 wt/wt.

In some embodiments, the composition has an efficiency of separation of at least 82%.

In some embodiments, a size of each alumina nanoparticle is from 30 nm to 80 nm.

In some embodiments, a number of repeat units in the polyurethane is from 100 to 10000.

In a second aspect, the disclosure provides a method that includes reacting a polyurethane and an intermediate that includes alumina nanoparticles to covalently bond the alumina nanoparticles to the polyurethane. Each alumina nanoparticle of the intermediate is covalently bonded to a first functional group that includes a fluorocarbon. Each alumina nanoparticle of the intermediate is also covalently bonded to a second functional group that is different from the first functional group. The second functional group is capable of undergoing protonation.

In certain embodiments, the method further includes reacting a further intermediate that includes alumina nanoparticles with hydroxyl functional groups with a first functional group precursor and a second functional group precursor different from the first functional group precursor to form the first intermediate.

In certain embodiments, the method further includes reacting alumina nanoparticles with a base to form the alumina nanoparticles with hydroxyl functional groups.

In certain embodiments, the second functional group and the second functional group precursor include at least one member selected from the group consisting of an amine, amide, carboxyl, sulfonate, pyridine, and hydroxyl group.

In certain embodiments, the second functional group precursor includes 3-(aminopropyl)triethoxysilane, 3-(aminopropyl)trimethoxysilane, (3-aminopropyl)-dimethylethoxysilane and/or (3-aminopropyl)-trimethoxysilane. In some embodiments, the second functional group includes a derivative of the second functional group precursor.

In certain embodiments, the first functional group precursor includes 1H,1H,2H,2H-perfluorooctyl-triethoxysilane, 1H,1H,2H,2H-perfluorooctyl-trimethoxysilane, 1H,1H,2H,2H-perfluorooctyl-diethoxyl-methylsilane and/or 1H,1H,2H,2H-perfluorooctyl-dimethyl-ethoxysilane. In some embodiments, the first functional group includes a derivative of the first functional group precursor.

In certain embodiments, the polyurethane is pretreated.

In certain embodiments, the base includes NaOH, KOH, and/or $Na_2CO_3$.

DETAILED DESCRIPTION

Compositions

Figure 1:
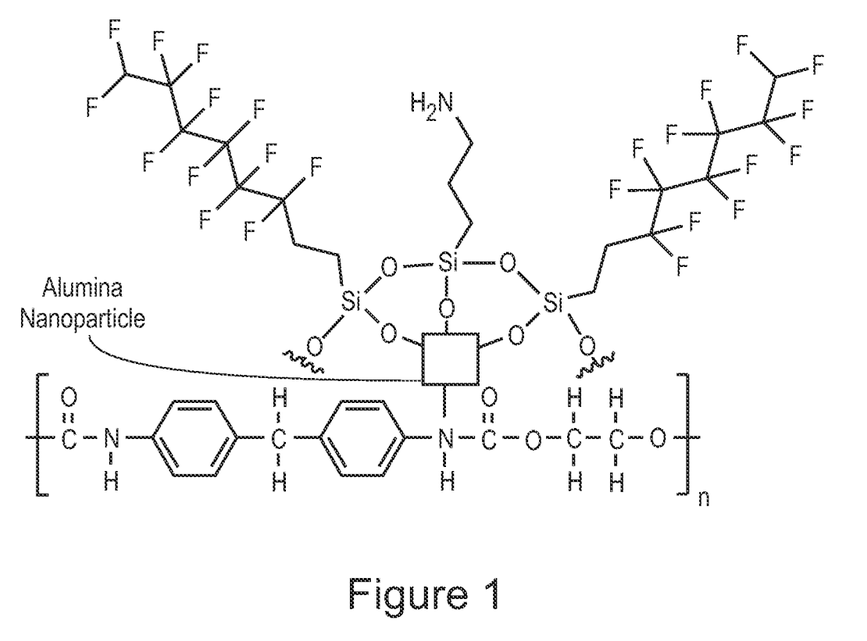
FIG. 1 depicts an embodiment of the composition.

FIG. 1 illustrates of an embodiment of a composition according to the disclosure. For clarity, only one alumina nanoparticle is shown. It is to be understood that, in general, the composition contains a plurality of such nanoparticles. The alumina nanoparticle is depicted as a square. The composition also includes a first functional group covalently bound to the alumina nanoparticle, a second functional group covalently bound to the alumina nanoparticle, and a polyurethane covalently bound to the alumina nanoparticle. The first and/or second functional groups may be covalently bound to other first and/or second functional groups.

In some embodiments, the first functional group (fluorocarbon-containing functional group) contains a derivative of 1H,1H,2H,2H-perfluorooctyl-triethoxysilane (FOTS). As used herein, a derivative of FOTS refers to a FOTS molecule in which at least one (e.g., all) of the oxygen atoms bound to the silicon atom is (are) not bound to an ethyl group and instead is (are) bonded to the surface of the alumina nanoparticle or another silicon molecule or does (do) not form a second bond. Although FIG. 1 depicts a particular derivative of FOTS, in some embodiments, the first functional group contains a polycyclic perfluoroalkane (e.g., perfluorodecalin), a cyclic perfluoroalkane (e.g., perfluoro-1,3-dimethylcyclohexane), a branched perfluoroalkane (e.g., perfluoro-2-methylpentane), and/or a linear perfluoroalkane (e.g., perfluorooctane). In some embodiments, the number of first functional groups per aluminum atom in a nanoparticle is at least one (e.g., at least two) and at most three.

In certain embodiments, the second functional group (capable of undergoing protonation) contains an amine. In certain embodiments, the second functional group contains a derivative of 3-(aminopropyl)triethoxysilane (APTES) (CAS #919-30-2). As used herein, a derivative of APTES refers to an APTES molecule in which at least one (e.g., all) of the oxygen atoms bound to the silicon atom is not bound to an ethyl group and instead bonds with the surface of the alumina nanoparticle or another silicon molecule or does not form a second bond. In certain embodiments, the derivative of 3-(aminopropyl)triethoxysilane (APTES) is a structure as depicted in FIG. 1. However, in other embodiments, the second functional group contains an amine, amide, carboxyl, sulfonate, pyridine, and/or hydroxyl group. In certain embodiments, the second functional group contains a derivative of an aminosilane (e.g., (3-aminopropyl)-diethoxy-methylsilane (APDEMS), (3-aminopropyl)-dimethyl-ethoxysilane (APDMES) or (3-aminopropyl)-trimethoxysilane (APTMS) (CAS #13822-56-5)). In some embodiments, the number of second functional groups per aluminum atom in a nanoparticle is at least one (e.g., at least two, at least three) and at most nine (e.g., at most eight, at most seven).

Generally, the polyurethane can be used as a support material. The polyurethane can be any polyurethane with good chemical stability and mechanical strength. In certain embodiments, the polyurethane contains a phenyl, alkyl, amine, carbonyl, amide, ester, and/or ether group. In certain embodiments, the polyurethane is the polyurethane depicted in FIG. 1. In certain embodiments, the number of repeat units, n, in the polyurethane is at least 100 (e.g., at least 500, at least 10000) and at most 10000 (e.g., at most 5000, at most 1000). In general, multiple alumina nanoparticles can bond to a single polyurethane. Generally, each alumina nanoparticle is bonded to a nitrogen atom of a different monomer of the polyurethane.

In some embodiments, the alumina nanoparticle has a size of at least 30 (e.g., at least 40, at least 50) nm and at most 80 (e.g., at most 70, at most 60).

The compositions can be used to remove an organic contaminant with a density less than or greater than that of water (i.e., 1.0 g/mL) from water (e.g., produced water, oilfield wastewater). In general, the organic contaminant can be above the water surface or below the water surface. Examples of organic contaminants include oil, non-polar solvents, hydrocarbons and halocarbons. Without wishing to be bound by theory, it is believed that the compositions can remove organic contaminants from water due to the relatively high water repellence of the compositions. Without wishing to be bound by theory, it is believed that, in some embodiments, the surface of composition can contain small pores containing fluorine-free functional groups (e.g., functionalized with APTES groups) that can absorb the organic contaminant and repel the water due to their superhydrophobicity.

In some embodiments, the compositions have an absorption capacity of at least 27 (e.g., at least 30, at least 40, at least 50) weight/weight (wt/wt) and at most 70 (e.g. at most 60, at most 50) wt/wt. As used herein, the absorption capacity is defined as $$C_a = \frac{W_t - W_o}{W_o}$$

where $W_o$ is the initial weight of the composition and $W_t$ is the final weight of the composition after being placed in a solution for 2 minutes. In some embodiments, the compositions may have an efficiency of separation at least 82 (e.g., at least 85, at least 90) % and at most 100 (e.g. at most 99, at most 98, at most 95, at most 90) % when applied to separate an organic contaminant from water. As used herein, the separation efficiency is defined as $$E_f = \frac{M_t}{M_o} \times 100\%$$

where $M_o$ and $M_t$ are the initial and final weights of the composition after a solution containing an organic contaminant in water is poured through a funnel containing the composition. In some embodiments, the compositions have a permeate flux of at least 8 (e.g. at least 10, at least 15, at least 20) L m$^{-2}$ hr$^{-1}$ and at most 33 (e.g. at most 30, at most 25, at most 20) L m$^{-2}$ hr$^{-1}$. As used herein, for a solution poured through a funnel containing the composition, the permeate flux is defined as $$\text{Flux} = \frac{V}{A \times \Delta t}$$

where V represents the volume of oil/water used that permeates across the area of the material surface in L, A represents the area of the material surface in m$^2$ and $\Delta t$ represents the time in hours.

In certain embodiments, the compositions are superhydrophilic at a pH of at least 0 (e.g., at least 1, at least 2, at least 3, at least 4, at least 5) and at most 7 (e.g., at most 6, at most 5). In certain embodiments, the compositions are superhydrophobic at a pH of at least 7 (e.g. at least 8, at least 9) and at most 14 (e.g. at most 13, at most 12, at most 11, at most 10, at most 9). As used herein, superhydrophilicity corresponds to a water contact angle of approximately 15° and superhydrophobicity corresponds to a water contact angle of approximately 148-160° as measured by optical tensiometer.

In certain embodiments, the compositions have a water contact angle of at least 0° (e.g. at least 5°, at least 10°, at least 15°, at least 20°, at least 25°, at least 30°, at least 35°, at least 40°) and at most 90° (e.g. at most 85°, at most 80°, at most 75°, at most 70°) at a pH of at least 0 (e.g., at least 1, at least 2, at least 3, at least 4, at least 5) and at most 7 (e.g., at most 6, at most 5).

In certain embodiments, the compositions have a water contact angle of at least 90° (e.g. at least 95°, at least 100°, at least 105°, at least 110°) and at most 180° (e.g. at most 175°, at most 170°, at most 165°, at most 160°, at most 155°, at most 150°, at most 145°, at most 140°) at a pH of at least 7 (e.g. at least 8, at least 9) and at most 14 (e.g. at most 13, at most 12, at most 11, at most 10, at most 9).

In some embodiments, the composition can absorb an organic contaminant present in an aqueous solution at a pH of at least 7 (e.g. at least 8, at least 9) and at most 14 (e.g. at most 13, at most 12, at most 11, at most 10, at most 9). In some embodiments, an organic component absorbed to the composition can desorb at a pH of at least 0 (e.g., at least 1, at least 2, at least 3, at least 4, at least 5) and at most 7 (e.g., at most 6, at most 5).

Synthesis of Compositions

Figure 2:
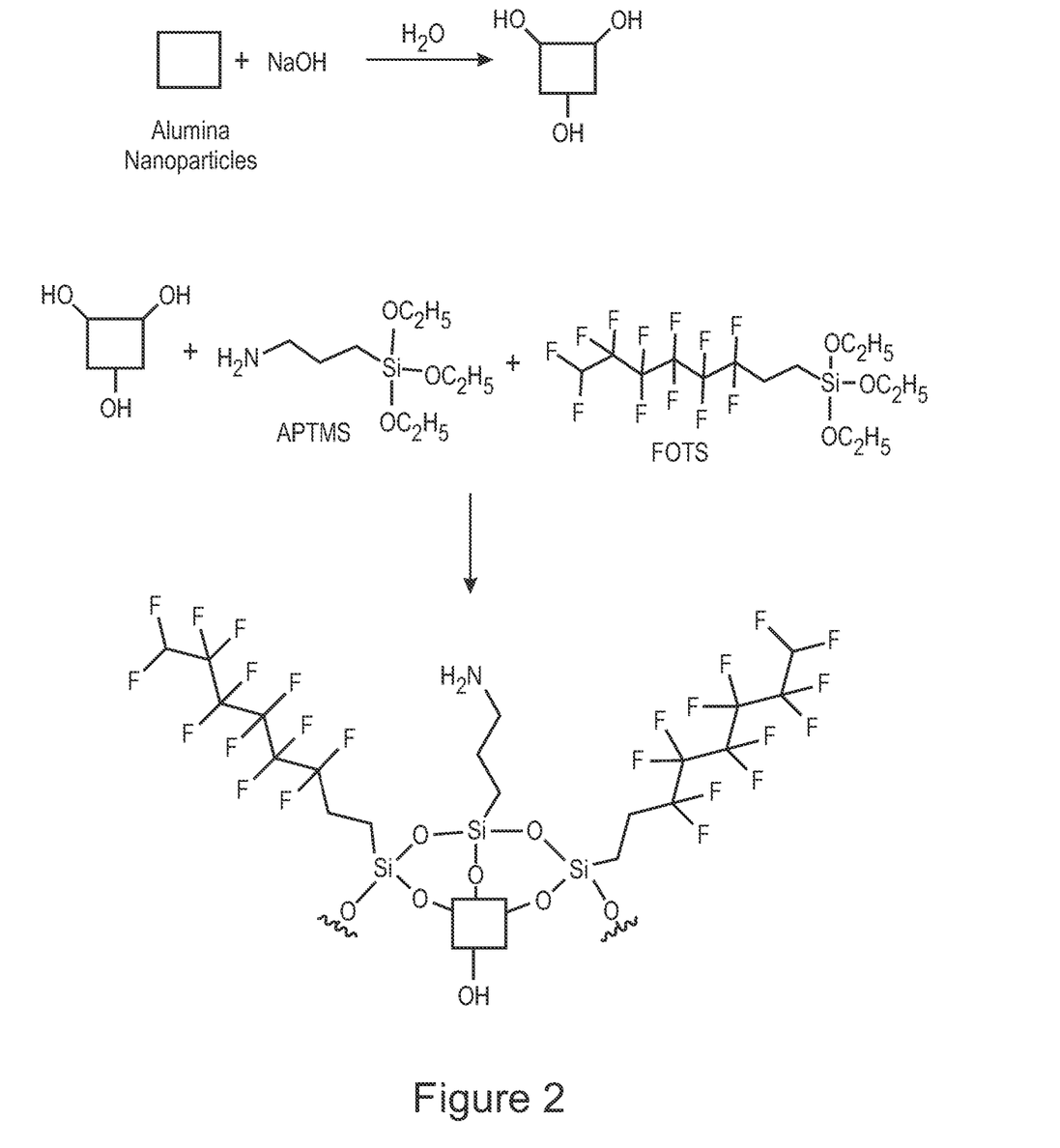
FIG. 2 depicts a synthetic scheme for the synthesis of the composition of FIG. 1.

FIG. 2 illustrates an embodiment of a synthetic scheme for the synthesis of a precursor of the composition of FIG. 1. Aluminum oxide ($Al_2O_3$) nanoparticles (depicted as squares) are combined with a base (e.g., NaOH, KOH, $Na_2CO_3$) to form alumina nanoparticles functionalized with hydroxyl groups on their surfaces. The surface-functionalized alumina particles are combined with a precursor for the second functional group (e.g., 3-(aminopropyl)triethoxysilane (APTES), 3-(aminopropyl)trimethoxysilane (APTMS)) and the precursor for the first functional group (e.g., 1H,1H,2H,2H-perfluorooctyl-triethoxysilane (FOTS)) to obtain alumina nanoparticles functionalized with the second and first functional groups (e.g., derivatives of APTES and FOTS). The alumina nanoparticles functionalized with the second and first functional groups (e.g., derivatives of APTES and FOTS) can be reacted with a pre-treated (surface activated) polyurethane to form the composition of FIG. 1.

In some embodiments, the precursor for the first functional group is a fluorocarbon with a triethoxysilane, a trimethoxysilane, a diethoxy-methylsilane, or a dimethyl-ethoxysilane. In some embodiments, the precursor for the first functional group contains a polycyclic perfluoroalkane (e.g., perfluorodecalin), a cyclic perfluoroalkane (e.g., perfluoro-1,3-dimethylcyclohexane), a branched perfluoroalkane (e.g., perfluoro-2-methylpentane), and/or a linear perfluoroalkane (e.g., perfluorooctane). In some embodiments, the precursor for the first functional group is 1H,1H,2H,2H-perfluorooctyl-triethoxysilane (FOTS)), 1H,1H,2H,2H-perfluorooctyl-trimethoxysilane, 1H,1H,2H,2H-perfluorooctyl-diethoxyl-methylsilane or 1H,1H,2H,2H-perfluorooctyl-dimethyl-ethoxysilane.

In certain embodiments, the precursor for the second functional group contains an amine, amide, carboxyl, sulfonate, pyridine, and/or hydroxyl group and a triethoxysilane, a trimethoxysilane, a diethoxy-methylsilane, or a dimethyl-ethoxysilane. In certain embodiments, the precursor for the second functional group is (3-aminopropyl)-triethoxysilane (APTES) (CAS #919-30-2), (3-aminopropyl)-diethoxy-methylsilane (APDEMS), (3-aminopropyl)-dimethyl-ethoxysilane (APDMES) or (3-aminopropyl)-trimethoxysilane (APTMS) (CAS #13822-56-5).

EXAMPLES

Example 1—Synthesis 5 grams (g) of alumina nanoparticles were added into 50 mL of ethanol. The solution was stirred for 3 hours. 50 mL of 0.1 M sodium hydroxide was added followed by stirring for 3 hours. The material was then separated by centrifugation. 5 mL 3-(aminopropyl)triethoxysilane (APTES), then 2 mL 1H,1H,2H,2H-perfluorooctyl-triethoxysilane (FOTS) were slowly added sequentially. The materials were then sonicated for 3 hours at 60° C. followed by stirring for 3 hours at 60° C. to produce APTES-FOTS-modified alumina nanoparticles, as shown in FIG. 2.

1 g of pre-treated polyurethane was added to a the mixture of APTES-FOTS-modified alumina nanoparticles with sonication for 10 hours at 60° C. to obtain APTES-FOTS-modified alumina grafted on polyurethane (AF-Al—PU) as shown in FIG. 1. The material was dried by vacuum drying.

Example 2—Water Contact Angle

To analyze the hydrophobicity and surface wettability, the water contact angle of the AF-Al—PU material synthesized in Example 1 was measured using an Attension Theta Optical Tensiometer (Biolin Scientific, Finland) with 5 µL droplets of distilled water at ambient temperature. The material was alternated between a pH of 1.7 and a pH of 10.

Figure 3:
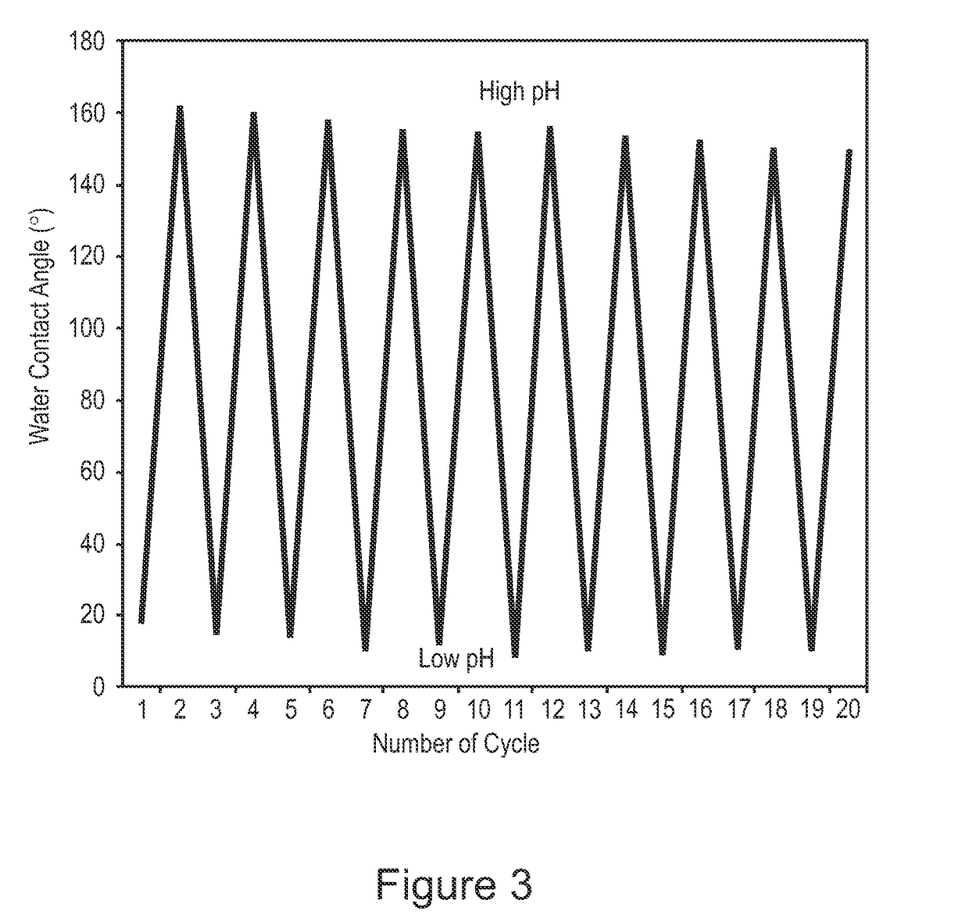
FIG. 3 provides experimental data showing the water contact angle as a function of pH.

FIG. 3 shows that under low pH conditions (i.e., pH of 1.7), the composition exhibited a water contact angle of approximately 15° corresponding to superhydrophilicity and under high pH conditions (i.e., pH of 10) the composition exhibited a water contact angle of approximately 148-160° corresponding to superhydrophobicity. Furthermore, FIG. 3 shows that wettability behavior of the composition was reversible as the composition was repeatedly altered between superhydrophilicity, as demonstrated by a water contact angle of approximately 15°, and superhydrophobicity, as demonstrated by a water contact angle of approximately 148-160°.

Example 3—Absorption Capacity

Oil absorption capacity tests were carried out in heptane, toluene, olive oil, dichloromethane, and tetrachloromethane. 50 mL of the organic compound was added to a 100 mL glass beaker containing 20 mL deionized water. 1 g of the AF-Al—PU material with an initial weight, $W_o$, was then added to the mixture. After 2 minutes, the composition was removed from the mixture and the final weight, $W_f$, was measured. The absorption capacity was also measured in produced water containing oil using the same procedure. For each solvent, the material was alternated between a pH of 1.7 and a pH of 10 prior to being added to the mixture.

The absorption capacity was calculated as $$C_a = \frac{W_t - W_o}{W_o}$$

where $W_o$ and $W_t$ are the initial and final weights of the composition, as described above. The process was repeated 19 times to provide a total of 20 cycles. Each cycle corresponded to a change in wettability from the hydrophobic to hydrophilic state, or from the hydrophilic to hydrophobic state. Mechanical squeezing was performed between each cycle to remove absorbed solvent.

Figure 4:
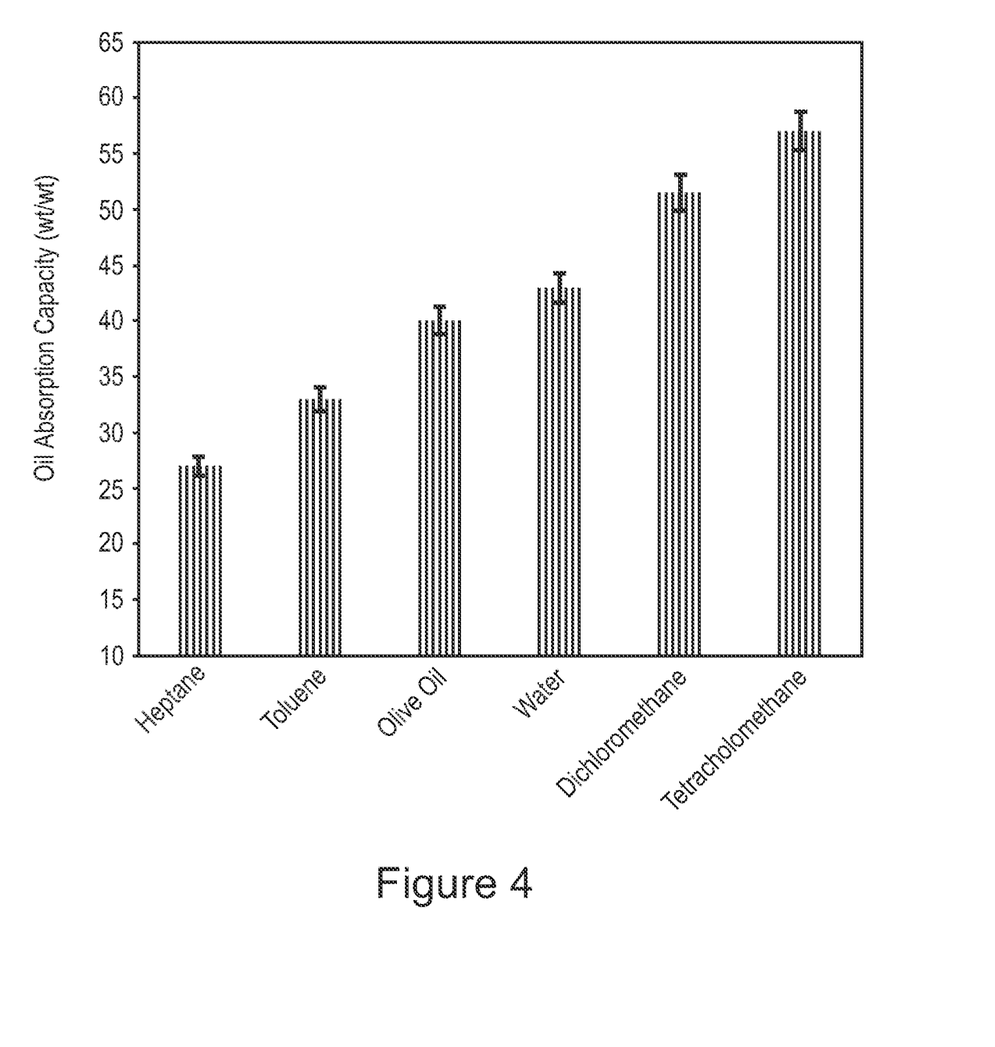
FIG. 4 provides experimental data of oil absorption capacity for various solvents.

FIG. 4 shows the average absorption capacity for each solvent measured after 3 cycles. The solvents with the lowest density, heptane and toluene, had the lowest absorption capacities, which may be due to their faster evaporation relative to the other solvents.

Figure 5:
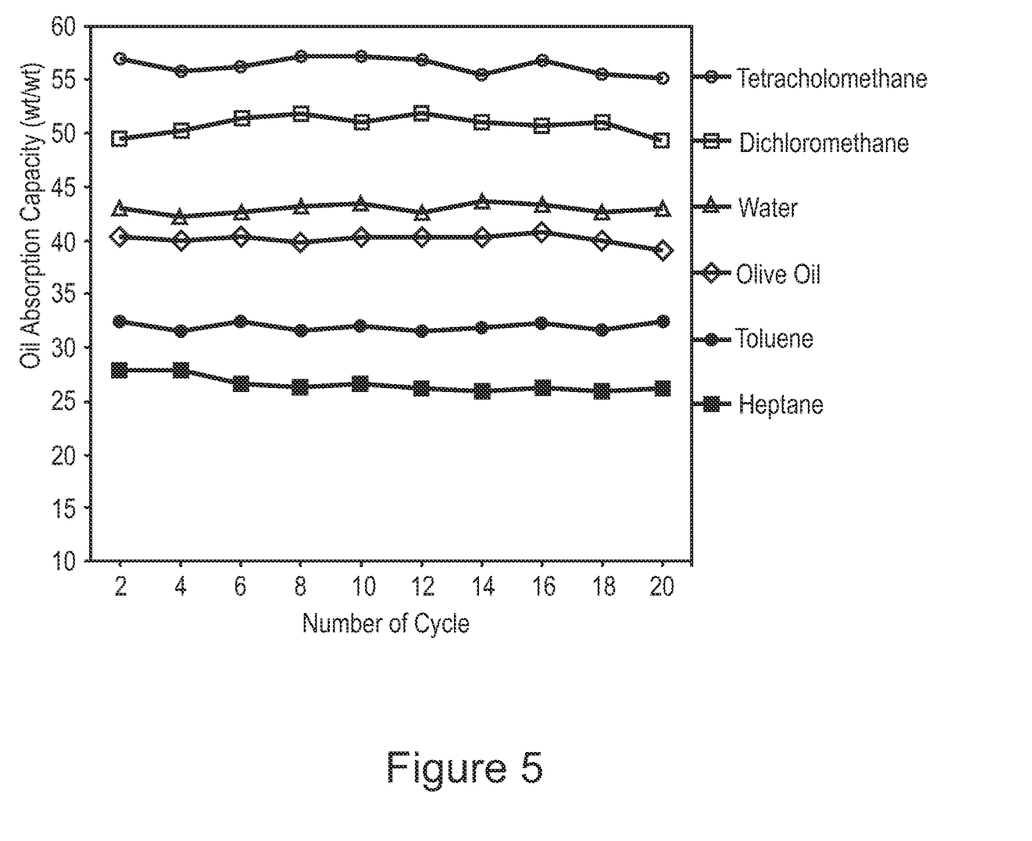
FIG. 5 provides experimental data of oil absorption capacity for various solvents after several cycles.

FIG. 5 shows the absorption capacity as a function of the number of cycles. FIG. 5 shows that the absorption capacity is stable over several cycles.

Other Embodiments

While only certain embodiments have been set forth, the disclosure is not limited to such embodiments.

As an example, while embodiments have been disclosed that include alumina nanoparticles, the disclosure is not limited to such embodiments. In some embodiments, the nanoparticles can contain silica, titania or zinc oxide.

As another example, while embodiments have been disclosed in which polyurethane is bonded to the alumina nanoparticles, the disclosure is not limited to such embodiments. In some embodiments, polyethylene and/or polypropylene may be covalently bonded to the nanoparticle.

What is claimed is:

1. A composition, comprising:
   alumina nanoparticles,
   wherein:
      each alumina nanoparticle is covalently bonded to a polyurethane;
      each alumina nanoparticle is covalently bonded to a first functional group comprising a fluorocarbon;
      each alumina nanoparticle is covalently bonded to a second functional group different from the first functional group; and
      the second functional group is capable of undergoing protonation.

2. The composition of claim 1, wherein the second functional group comprises at least one member selected from the group consisting of an amine, amide, carboxyl, sulfonate, pyridine, and hydroxyl group.

3. The composition of claim 2, wherein the second functional group comprises a derivative of at least one member selected from the group consisting of 3-(aminopropyl)triethoxysilane, (3-aminopropyl)-diethoxy-methylsilane, (3-aminopropyl)-dimethyl-ethoxysilane and (3-aminopropyl)-trimethoxysilane.

4. The composition of claim 1, wherein the first functional group comprises a derivative of at least one member selected from the group consisting of 1H, 1H,2H,2H-perfluorooctyl-triethoxysilane, 1H, 1H,2H,2H-perfluorooctyl-trimethoxysilane, 1H, 1H,2H,2H-perfluorooctyl-diethoxyl-methylsilane and 1H, 1H,2H,2H-perfluorooctyl-dimethyl-ethoxysilane.

5. The composition of claim 1, wherein at least one of the following holds:
   the polyurethane is directly covalently bonded to the alumina nanoparticle;
   the first functional group is directly covalently bonded to the alumina nanoparticle; or
   the second functional group is directly covalently bonded to the alumina nanoparticle.

6. The composition of claim 1, wherein at least one of the following holds:
   at least a portion of the first functional group is covalently bonded to other first functional groups that are covalently bonded to the same alumina nanoparticle;
   at least a portion of the first functional group is covalently bonded to second functional groups that are covalently bonded to the same alumina nanoparticle; or
   at least a portion of the second functional group is covalently bonded to other second functional groups that are covalently bonded to the same alumina nanoparticle.

7. The composition of claim 1, wherein:
   when the composition is at a pH of less than 7, the composition is superhydrophilic; and
   when the composition is at a pH of greater than 7, the composition is superhydrophobic.

8. The composition of claim 7, wherein:
   when the composition is at a pH of less than 7, the composition has a water contact angle of 0° to 90°; and
   when the composition of at a pH of greater than 7, the composition has a water contact angle of 90° to 180°.

9. The composition of claim 1, wherein the composition has an oil absorption capacity of at least 27 wt/wt.

10. The composition of claim 1, wherein the composition has an efficiency of separation of at least 82%.

11. The composition of claim 1, wherein a size of each alumina nanoparticle is from 30 nm to 80 nm.

12. The composition of claim 1, wherein a number of repeat units in the polyurethane is from 100 to 10000.

13. The composition of claim 1, wherein:
the second functional group comprises a derivative of at least one member selected from the group consisting of 3-(aminopropyl)triethoxysilane, (3-aminopropyl)-diethoxy-methylsilane, (3-aminopropyl)-dimethyl-ethoxysilane and (3-aminopropyl)-trimethoxysilane; and
the first functional group comprises a derivative of at least one member selected from the group consisting of 1H, 1H,2H,2H-perfluorooctyl-triethoxysilane, 1H, 1H,2H, 2H-perfluorooctyl-trimethoxysilane, 1H,1H,2H,2H-perfluorooctyl-diethoxyl-methylsilane and 1H,1H,2H, 2H-perfluorooctyl-dimethyl-ethoxysilane.

14. The composition of claim 1, wherein the second functional group comprises a derivative of 3-(aminopropyl) triethoxysilane.

15. The composition of claim 1, wherein the first functional group comprises a derivative of 1H, 1H,2H,2H-perfluorooctyl-triethoxysilane.

16. The composition of claim 1, wherein:
the second functional group comprises a derivative of 3-(aminopropyl)triethoxysilane; and
the first functional group comprises a derivative of 1H, 1H,2H,2H-perfluorooctyl-triethoxysilane.

17. The composition of claim 1, wherein:
at least a portion of the first functional group is covalently bonded to other first functional groups that are covalently bonded to the same alumina nanoparticle; and
at least a portion of the first functional group is covalently bonded to second functional groups that are covalently bonded to the same alumina nanoparticle.

18. The composition of claim 1, wherein:
at least a portion of the first functional group is covalently bonded to other first functional groups that are covalently bonded to the same alumina nanoparticle; and
at least a portion of the second functional group is covalently bonded to other second functional groups that are covalently bonded to the same alumina nanoparticle.

19. The composition of claim 1, wherein:
at least a portion of the first functional group is covalently bonded to second functional groups that are covalently bonded to the same alumina nanoparticle; and
at least a portion of the second functional group is covalently bonded to other second functional groups that are covalently bonded to the same alumina nanoparticle.

20. The composition of claim 1, wherein:
at least a portion of the first functional group is covalently bonded to other first functional groups that are covalently bonded to the same alumina nanoparticle;
at least a portion of the first functional group is covalently bonded to second functional groups that are covalently bonded to the same alumina nanoparticle; and
at least a portion of the second functional group is covalently bonded to other second functional groups that are covalently bonded to the same alumina nanoparticle.

* * * * *

UNITED STATES PATENT AND TRADEMARK OFFICE
CERTIFICATE OF CORRECTION

PATENT NO. : 12,163,006 B2
APPLICATION NO. : 17/870314
DATED : December 10, 2024
INVENTOR(S) : Tawfik A. Saleh, Elaf A. Ahmed and Hasan Al Abdulgader It is certified that error appears in the above-identified patent and that said Letters Patent is hereby corrected as shown below:

In the Claims

In Column 8, Line 26, Claim 4, please replace "1H, 1H,2H,2H-" with -- 1H,1H,2H,2H- --.

In Column 8, Line 27, Claim 4, please replace "1H, 1H,2H,2H-" with -- 1H,1H,2H,2H- --.

In Column 8, Line 28, Claim 4, please replace "1H, 1H,2H,2H-" with -- 1H,1H,2H,2H- --.

In Column 8, Line 29, Claim 4, please replace "1H, 1H,2H,2H-" with -- 1H,1H,2H,2H- --.

In Column 9, Lines 8-9, Claim 13, please replace "1H, 1H,2H,2H-" with -- 1H,1H,2H,2H- --.

In Column 9, Lines 9-10, Claim 13, please replace "1H, 1H,2H,2H-" with -- 1H,1H,2H,2H- --.

In Column 9, Line 17, Claim 15, please replace "1H, 1H,2H,2H-" with -- 1H,1H,2H,2H- --.

In Column 9, Lines 22-23, Claim 16, please replace "1H, 1H,2H,2H-" with -- 1H,1H,2H,2H- --.

Signed and Sealed this
Fourth Day of February, 2025

Coke Morgan Stewart
*Acting Director of the United States Patent and Trademark Office*